United States Patent Office 3,407,311
Patented Oct. 22, 1968

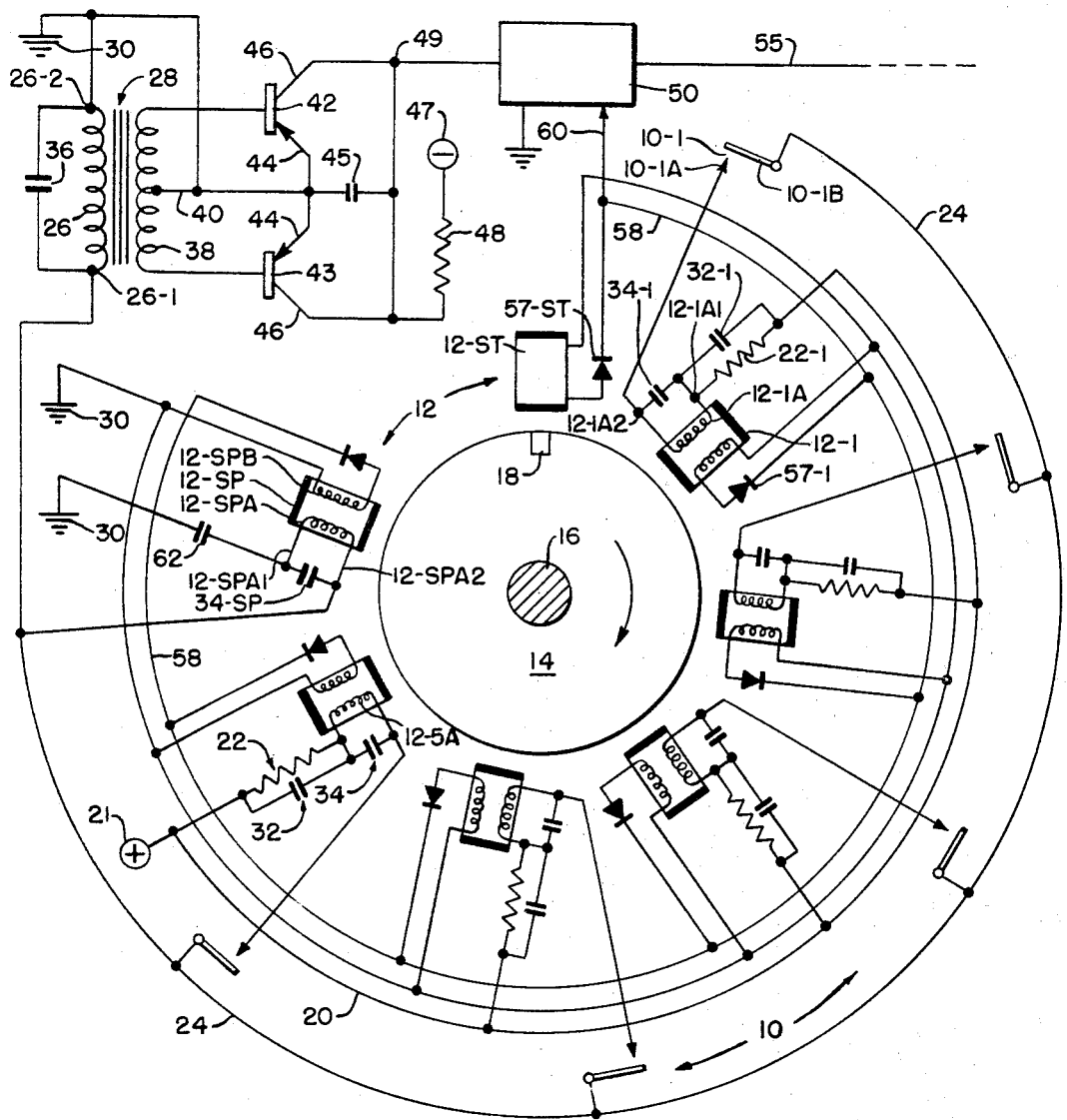

3,407,311
CONTACT CLEANING CIRCUIT
Theodore A. Hansen, Park Ridge, Ill., assignor to Teletype Corporation, Skokie, Ill., a corporation of Delaware
Filed Dec. 13, 1965, Ser. No. 513,301
4 Claims. (Cl. 307—137)

ABSTRACT OF THE DISCLOSURE

A magnetomotive telegraph distributor includes a plurality of pickup heads, equal in number to the number of information bits in a character plus the start and stop bits, arranged around the periphery of a nonmagnetic rotating disc having a magnetic slug embedded therein. A pair of tape sensing contacts in a perforated tape reader are connected in series with each pickup head and with a source of D-C voltage. Each head and an associated current-limiting resistance is shunted by a capacitor; so that when the contacts initially are closed, a high energy pulse causes arcing across the contacts to burn out contaminants on them. A low D-C current then is maintained through the closed contacts, and the pulses generated in the pickup heads by the moving slug are superimposed on this D-C current to provide outputs indicative of closed contacts.

---

In the operation of a telegraph transmitter that transmits telegraph signals in response to perforations in a paper tape, a plurality of contact pairs is used to respond to the sensing of the perforated or unperforated condition of the tape. Current passing through these contact pairs is then used to generate electrical code impulses seriatim over a telegraph line. With the advent of electronic telegraph equipment, the voltage applied to these telegraph contact pairs and the current passing through them has been reduced from the previously-used values of approximately 120 volts D.C. and 60 milliamperes, respectively, to values at which minute lint particles and other contaminants can successfully prevent electrical continuity between these contact pairs even though they are mechanically closed.

Therefore, it is an object of the present invention to pass information through a mechanically-closed contact pair even though contaminants enter between the two contacts of the contact pair.

It is another object of the present invention to overcome contaminants preventing electrical continuity through a mechanically closed contact pair.

In accordance with the preferred embodiment of the present invention as applied to a telegraphic tape transmitter, closure of a contact pair upon sensing a perforation in the tape causes a pulse of unidirectional current to pass through the contact pair at a high supply voltage, thereby incinerating any lint or other contaminants present on the contact which would otherwise prevent electrical continuity between mechanically closed contacts. The voltage at which this pulse of current is supplied is insufficient to overcome a mechanically-open contact pair which is sensing an unperforated portion of the tape. The path of this current pulse is capacitive in nature; and after the pulse has dissipated, a high series resistance permits a small amount of unidirectional current to trickle through the closed contact pair. A single cycle of alternating current of a predetermined frequency is superimposed upon this trickle of unidirectional current passing through this closed contact pair, and a circuit tuned to the predetermined frequency senses the presence of this superimposed A.C. signal and provides this information to a utilization device which transmits that bit of information over the telegraph line.

A more complete understanding of the invention may be had by referring to the following detailed description in conjunction with the accompanying drawing wherein a complete circuit is shown for sensing and transmitting the code contained in a strip of perforated paper tape.

In the drawing there is shown a telegraph distributor circuit for use in connection with a telegraph tape reader which may, for example, be of the type shown in Patent No. 3,014,092, granted to J. L. De Boo on Dec. 19, 1961. In transmitting from a perforated record tape to a telegraph transmission line, the perforations in the tape are sensed by a device such as that shown in the De Boo patent. In response to the presence of holes in the tape, a plurality of "tape-sensing" contact pairs 10 are selectively closed in a permutative pattern identical to the pattern of the holes arranged in a row across the width of the tape. If any of the contact pairs 10 that are intended to close fail to close electrically, this causes an error to occur in the transmission of the data represented by the holes in the tape. The data bits read simultaneously by the tape reader are sequentially impressed on a telegraph line.

In the drawing, a plurality of magneto-electric voltage-generating pickups 12 are stationarily mounted around the periphery of a nonmagnetic flywheel 14 in a special pattern representative of the desired time distribution of the data bits as they are to be transmitted sequentially over the telegraph line. The flywheel 14 is firmly attached to a shaft 16 of the tape reader that rotates through one revolution for each cycle of tape-reader operation. The shaft 16 may correspond to the shaft 19 in the De Boo patent. A "slug" 18 of magnetic material is embedded in the periphery of this flywheel; and when this "slug" passes across one of the magneto-electric pickups, the coil of the magneto-electric pickup generates a voltage output having substantially a sinusoidal waveform. These sequential pulses are passed through the tape-sensing contact pairs 10 of the tape reader just prior to the beginning of the transmission of their associate data bits. In order to assure that these magneto outputs will be properly passed through those of the tape-sensing contacts that are closed, a circuit is provided in the drawing to assure electrical continuity through each tape-sensing contact pair prior to the generation of its associate magneto pulse.

A 120-volt, D.C. source 21 provides supply voltage on a bus wire 20 to a plurality of 100,000-ohm resistors 22. Since the circuits for all five code levels are the same, only the No. 1 data level will be fully described. The 100,000 ohm resistor 22–1 of the No. 1 data level is connected from the bus wire 20 to one of the terminals 12–1A1 of one of the two coils 12–1A of the No. 1 magneto pick-up 12–1. The other terminal 12–1A2 of this coil 12–1A is connected to one contact 10–1A of the No. 1 tape-sensing contact pair 10–1. The other contact 10–1B of tape sensing contact pair 10–1 is connected to a common bus 24 which is in turn connected to one terminal 26–1 of the primary winding 26 of a coupling transformer 28. The other terminal 26–2 of the primary winding 26 of this coupling transformer 28 is connected to a return path to ground 30 of the 120-volt D.C. source.

Bypass capacitors 32 shunt each of the 100,000 ohm series resistors 22. Tuning capacitors 34 shunt the two terminals A1 and A2 of each of the magneto coils 12–1A to 12–5A, and another shunt capacitor 36 shunts the primary winding 26 of the coupling transformer 28. As the No. 1 code reading contact pair 10–1 is closed in response to a hole in the No. 1 code position, a unidirectional surge of current flows from the 120 volt DC supply over the bus wire 20 and through the bypass capacitor 32–1 and the tuning capacitor 34–1 and shunt capacitor 36 to the ground return 30 of the 120 volt source. After this capacitor circuit has become charged, a 1.2-milliampere D-C current continues to flow through the series resistor 22–1, the coil 12–1A of the No. 1 magneto pickup 12–1, the No. 1 code reading contact 10–1, and the primary winding 26 of the coupling transformer 28.

The 120 volt potential available for this purpose is sufficient to break down most forms of contamination that are encountered in telegraph apparatus such as lint, phenolic residue, oil, etc. The surge of current provided by the three series capacitors in each code level provides sufficient sparking action in the contact gaps to incinerate any residue contained therein or which might at some time grow into a contact problem. The 1.2-milliampere current trickle maintained after the initial current surge assures a steady electrical continuity through the contacts as long as they are closed.

Following the closure of selected ones of the code reading contacts 10 in accordance with a code combination of perforations in the tape, the slug 18 in the nonmagnetic flywheel 14 passes across the pole face of magneto-electric pickup 12–1. A voltage pulse of substantially sinusoidal wave shape is thereby generated in pickup coil 12–1A. The value of the tuning capacitor 34–1 which is coupled across the terminals 12–1A1 and 12–1A2 of the coil 12–1A of the No. 1 magneto 12–1 is so proportioned that together with the inductance of the coil 12–1A they form an LC tuned circuit which is resonant at a frequency corresponding to the sinusoidal voltage pulse generated by the magneto pickup. This prevents the tuning capacitor 34–1 of the No. 1 magneto-electric coil 12–1A from simply shunting the sinusoidal timing pulse thus generated, since the impedance across a parallel-tuned LC "tank" circuit is theoretically infinite at its resonant frequency. Both the bypass capacitor 32–1 and the 120 volt DC power supply function as a low-impedance A.C. current path linking the No. 1 magneto coil 12–1A through the No. 1 code-reading contact 10–1 to the primary winding 26 of the coupling transformer 28. The bypass tuning capacitors 32 connected across the series resistor 22 are so proportioned that each of the bypass capacitors 32 together with the inductance of the primary winding 26 of the coupling transformer 28 forms a series-tuned LC circuit resonant at the same frequency as the circuit comprising the magneto coil 12–1A and its tuning capacitor 34–1. The shunt capacitor 36 is of low capacitance with respect to the value of bypass capacitors 32 and slightly reduces the effective inductive reactance of primary 26.

Therefore, when the No. 1 code-reading contact pair 10–1 closes in response to a hole in the tape in the No. 1 code level, 120 volts is applied across the contact pair 10–1 with a large transient surge of D.C. current passing through this contact pair to incinerate contaminants in the contact gap. A current trickle is maintained through the contact pair 10–1 after this surge of current has dissipated. When the No. 1 code level is to be sampled, the No. 1 magneto coil 12–1A generates a voltage of sinusoidal wave shape that is superimposed upon the current trickle and passes through the No. 1 code reading contact pair 10–1 to the coupling transformer 28.

The secondary winding 38 of transformer 28 has its rectifiers comprising two transistors 42 and 43 instead of the more conventional diodes. This forms a push-pull amplification stage coupled with a rectifier. A filter capacitor 45 is connected between the collectors 46 of the two transistors 42 and 43 and ground 30. The emitter terminals 44 of transistors 42 and 43 are also connected to ground 30. A negative, DC voltage source 47 is connected through a load resistor 48 to the collectors 46 of the two transistors 42 and 43. When either transistor 42 or transistor 43 is turned on by a voltage pulse of the proper polarity on the secondary winding 38 of the transformer 28 it saturates causing current to flow from ground 30, through one of the transistors 42 or 43 and load resistor 48 to the negative voltage source 47. This rectifying and filtering circuit provides a signal on wire 49 which is at substantially ground potential during the time that a sinusoidal pulse is coupled from a magneto pick-up through a code-sensing contact and is substantially at the potential of the negative voltage source 47 when no sinusoidal pulse is available to energize the primary winding 26 of transformer 28. This signal on wire 49 is then used to prepare a suitable electronic telegraph transmitter 50 to transmit over a telegraph line 55.

In order to supply accurate timing pulses to the electronic transmitter 50 for controlling the telegraph line 55, an additional coil is incorporated into each magneto-electric pick-up 12–1 to 12–5 for generating a sinusoidal timing pulse that can be used by the electronic transmitter 50 to properly sample the data represented by the output voltage on wire 49 and deliver this information to the telegraph line 55.

During the idle condition of the telegraph line 55 and after transmission of each character has been completed, the telegraph line 55 is substantially in its "marking" or binary "1" condition. When transmission of a character is to begin, the telegraph line 55 is changed from its "marking" condition to its "spacing" (binary "0") condition. To accomplish this, the slug 18 on nonmagnetic flywheel 14 passes in front of start magneto pick-up 12–ST which has only one active winding. The sinusoidal voltage pulse generated in start pick-up 12–ST is coupled through an OR-gate diode 57–ST which permits only the positive half-cycle of the sinusoidal voltage pulse to be applied between ground 30 and bit-timer bus wire 58. Bit-timer bus wire 58 conducts this positive half-cycle of the pulse issuing from the start pick-up 12–ST through wire 60 to the electronic transmitter 50. On the trailing edge of the positive half-cycle of this timing pulse, electronic transmitter 50 samples output wire 49 to see if transistors 42 and 43 are rectifying a sinusoidal pulse passing through a closed contact pair 10. Since start pick-up 12–ST is not connected in any way to one of the code-reading contacts, there can be no ground voltage on output wire 49, but wire 49 is at the potential of the negative voltage source 47. Therefore, electronic transmitter 50 changes the condition of the telegraph line 55 from marking to spacing. Slug 18 on flywheel 14 then moves to the No. 1 code pick-up 12–1 generating the sinusoidal voltage pulse on coil 12–1A which has already been described. Simultaneously, slug 18 generates a sinusoidal voltage pulse on coil 12–B. The positive half-cycle of this pulse passes through diode 57–1 and is conducted by the bit-timer bus 58 and wire 60 to the electronic transmitter 50. On the trailing edge of this positive half-cycle of voltage appearing on wire 60 from pick-up coil 12–1B, electronic transmitter 50 samples output wire 49. Assuming that code reading contact pair 10–1 is closed, the positive half-cycle of the voltage pulses generated by the two coils 12–1A and 12–1B of pick-up 12–1 will be in exact synchronism and the leading edge of the positive half-cycle of the voltage pulse generated by coil 12–1A will pass through contact pair 10–1 and will be rectified by transistor 42 causing the transistor 42 to saturate and to provide ground potential through center tap 40 and across the emitter 44 and collector 46 terminals of transistor 42 and place substantially ground potential on wire 49. Therefore, wire 49 will be at ground potential when the trailing edge of the positive half-cycle of the voltage pulse generated by coil 12–1B causes electronic transmitter 50 to sample the condition of wire 49. This causes electronic transmitter 50 to apply a marking condition to telegraph line 55 in response to the closed condition of the No. 1 code-sensing contact pair 10–1.

The Nos. 2, 3, 4, and 5 code levels are identical to code level No. 1; and as slug 18 passes in front of magneto pick-ups 12–2, 12–3, 12–4 and 12–5 in their proper succession, the electronic transmitter 50 places a marking condition on telegraph line 55 in response to a closed tape-sensing contact pair and places a spacing condition on telegraph line 55 in response to an open tape-sensing contact pair.

The last magneto pick-up 12–SP is used to generate the marking stop pulse which indicates the end of transmission of a telegraph character. Terminal 12–SPA1 of pick-up coil 12–SPA is connected to ground 30 through a D.C. isolation capacitor 62, and the other terminal 12–SPA2 of coil 12–SPA is connected directly to bus wire 24 and to the input terminal 26–1 of the primary 26 of transformer 28. Coil 12–SPA, like the A coils of the other pick-ups 12 has a tuning capacitor 34–SP to form a tuned circuit with coil 12–SPA. Since coil 12–SPA is coupled directly to primary winding 26, a sinusoidal voltage pulse generated by coil 12–SPA always causes transistors 42 and 43 to apply the potential of ground 30 on wire 49 so that the sinusoidal timing pulse issued by coil 12–SPB always causes electronic transmitter 50 to place a marking-stop condition on the telegraph line 55.

At approximately the same time in the cycle of the tape transmitter at which the No. 4 code level is sampled, a tape feed operation is initiated in order to advance the tape one unit of length to bring the next row of code holes in the tape into the tape-sensing position. The tape-feed operation is initiated during the No. 4 code bit because the mechanical tape-feed mechanism requires considerable time to overcome its own inertia and to begin moving the tape to bring the next row of code holes in the tape into cooperating relation with the contacts 10. Actual tape feeding takes place after transmission of the No. 5 code bit. Sensing of these next code holes in the tape causes tape-sensing contact pairs 10 to selectively close, and continued rotation of flywheel 14 causes the initiation of transmission of the next character.

Although only one embodiment of the invention is shown in the drawings and described in the foregoing specification it will be understood that invention is not limited to the specific embodiment described, but is capable of modification and rearrangement and substitution of parts and elements without departing from the spirit of the invention.

What is claimed is:

1. A circuit for assuring electrical continuity across a closable contact pair comprising:
   a D-C voltage source for providing a voltage of sufficient magnitude to generate an electrical arc across the contact pair only in their substantially closed position and for providing a current of sufficient magnitude to incinerate contaminants precluding surface-to-surface engagement between the contacts of the pair in said substantially closed position;
   means for initially applying substantially the full voltage of the source to the contact pair and for initially conducting electrical current from the source of sufficient magnitude to incinerate contaminants between the contact pair;
   means for conducting a steady D-C current through the closed contact pair at a magnitude substantially lower than the initially-conducted current;
   means for superimposing a pulse of varying current on the steady D-C current passing through the closed contacts; and
   means substantially insensitive to the initially conducted current for sensing the presence of the pulse of the varying current on the steady current.

2. A circuit according to claim 1 wherein the means for superimposing a pulse of varying current on the steady D-C current comprises:
   an inductive device connected in series with the contact pair and through which the steady D-C current passes; and
   a capacitor connected in parallel with the inductive device for conducting the initial incinerating current passing through the contact pair.

3. A circuit according to claim 2 wherein the sensing means comprises:
   a transformer, the primary winding of which is connected in series with the contact pair, for generating a pulse of current on the secondary winding thereof in response to passage of the pulse of varying current through the primary winding; and
   a capacitor connected in parallel with the primary winding of the transformer for conducting the initial incinerating current passing through the contact pair.

4. A circuit according to claim 3 wherein:
   the capacitor connected in parallel with the inductive device is so proportioned as to form a resonant circuit therewith at the frequency of a sinusoidal component of the pulse of varying current; and
   the capacitor connected in parallel with the primary winding of the transformer is so proportioned as to form therewith a resonant circuit at the same frequency as that of the resonant circuit of the inductive device.

References Cited

UNITED STATES PATENTS

| | | |
|---|---|---|
| 2,647,165 | 7/1953 | Buchner. |
| 2,758,223 | 8/1956 | Mueller _____ 307—137 |
| 3,110,767 | 11/1963 | Smith _____ 178—52 |
| 3,229,040 | 1/1966 | Drake et al. _____ 307—137 X |

ROBERT K. SCHAEFER, *Primary Examiner.*

T. B. JOIKE, *Assistant Examiner.*